March 12, 1957  R. F. BRENNEN ET AL  2,785,282

CONTROL MECHANISM FOR WELDING APPARATUS

Filed Nov. 10, 1955

INVENTOR.
Ronald F. Brennen
James A. Bucci.
BY H. M. Kilpatrick
ATTORNEY.

United States Patent Office 2,785,282
Patented Mar. 12, 1957

2,785,282

CONTROL MECHANISM FOR WELDING APPARATUS

Ronald F. Brennen and James A. Bucci, Brooklyn, N. Y., assignors to Welding Industry Research & Patent Corporation, New York, N. Y., a corporation of New York Application November 10, 1955, Serial No. 546,205

13 Claims. (Cl. 219—89)

This invention relates to welding mechanism and to means for moving welding electrodes toward work pieces therebetween to be welded and more particularly to mechanism for controlling the switch which in circuit with the primary of a transformer supplies welding current to the electrodes though it is noted that in some of the claims the invention is not limited to transformer current nor to switch control.

Objects of the invention are to provide an improved switch and electrode control apparatus of this kind which is mainly non-electrical and is not subject to the defects of all electric control.

Other objects of the invention are to provide an improved device of this kind in which the application of welding current is automatically withheld and applied only after the electrodes are pressed on the work pieces.

Additional objects of the invention are to effect simplicity and efficiency in such apparatus and to provide an extremely simple control of this kind which is durable and reliable in operation, and economical to manufacture.

Still other objects of the invention will appear as the description proceeds; and while herein details of the invention are described in the specification and some of the claims, the invention as described in the broader claims is not limited to these, and many and various changes may be made without departing from the scope of the invention as claimed in the broader claims.

The inventive features for the accomplishment of these and other objects are shown herein in connection with an improved control mechanism for a welding assembly which briefly stated includes a transformer having the ends of its secondary electrically connected to fixed and movable welding electrodes respectively. The control mechanism includes a power cylinder having a piston therein, and means operatively connecting the piston and movable electrode for urging the movable electrode to work pieces between it and the fixed electrode. A switch in circuit with the transformer primary has one fixed contact member cooperating with a movable contact carried by said cylinder. Means are provided for at will supplying air under pressure to the cylinder between the piston and cylinder head for forcing them apart, thereby closing the switch and moving the movable electrode to work pieces between the electrodes. Two forms of mechanism are shown for retarding the closing of the switch until the electrodes press on the work pieces.

Figure 1:
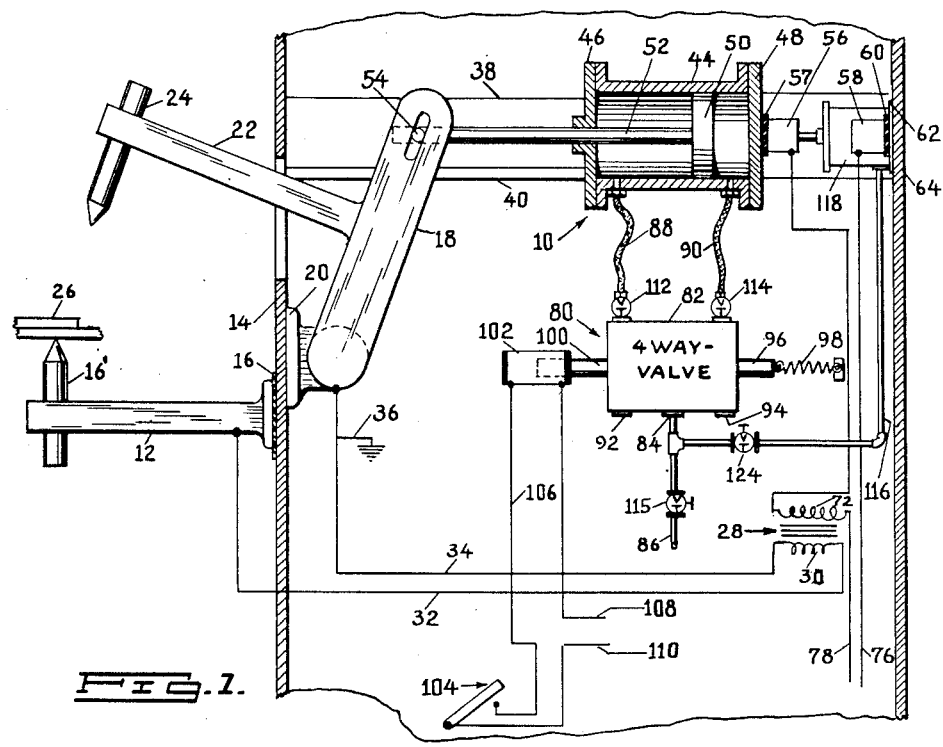
Figure 2:
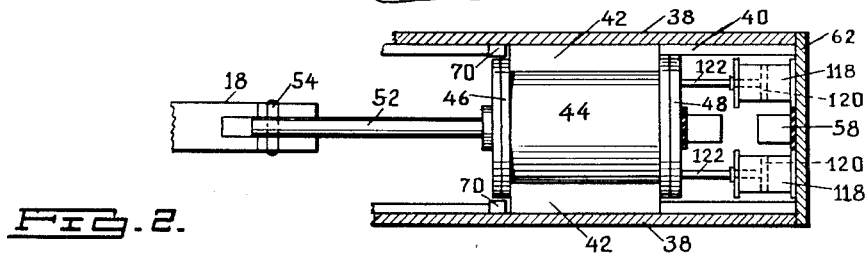
Figure 3:
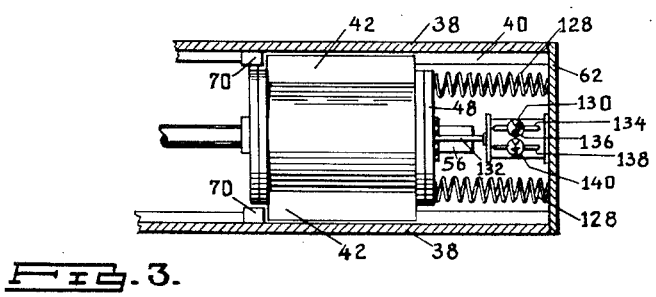

In the accompanying drawing showing, by way of example, two of many possible embodiments of the invention, Fig. 1 is a side elevation partly in vertical section and partly diagrammatic showing one form of the invention, Fig. 2 is a fragmental plan showing part of the structure of Fig. 1; and Fig. 3 is a fragmental plan showing another form of the invention.

Our improved switch control mechanism 10 is shown in combination with an electric welding assembly comprising a fixed electrode holder 12 mounted on a part of a housing 14, or other fixed support and carrying insulated therefrom by insulation at 16, a fixed electrode 16'. A substantially upright lever 18 pivoted at its lower end on a bracket 20 on said support carries a movable electrode holder 22 carrying a movable electrode 24 movable toward and from the work pieces 26 resting on the fixed electrode. A transformer 28 has the ends of its secondary 30 connected by suitable conductors 32, 34 to said holders respectively for supplying welding current, the conductor and lever being grounded on the housing as indicated at 36.

Said control mechanism 10 includes a pair of parallel guides 38 mounted on said support, each having a lower inturned flange 40 on which rests one of two shoes 42 (Fig. 2) carried on a power cylinder 44 having heads 46, 48 at its ends and disposed between and axially parallel to the guides in the plane of movement of said lever said shoes 42 being made of bearing material and slidably supported and guided on the flanges 40 of the guides 38. A piston 50 in said cylinder has a piston rod 52 passing through the piston rod head 46 adjacent to said lever and pivoted as at 54 to the upper end of the lever.

A switch contact block 56 mounted on the insulation 57 mounted on the closed head 48 of the cylinder is engageable with a fixed switch contact block 58 mounted on insulation 60 mounted on a plate 62 on the housing wall 64 thus limiting the movement of the cylinder in one direction.

Stops 70 (Fig. 2) fast on the guides 38 and engageable by the shoes limit movement of the cylinder in the other direction. Said contact blocks 56, 58 constitute a switch interposed and connected in circuit with the primary 72 of the transformer by conductors 74, 76, 78 for connection with a source of alternating current for energizing the transformer.

A four-way valve 80 having a valve body 82 having a supply port 84 connected by supply line 86 to a source of compressed air, has two translation or inlet ports connected respectively by flexible hose 88, 90 to the opposite ends of the cylinder 44, and has exhaust ports 92, 94. A movable core 96 in the body is biased by a spring 98 to a normal inactive position in which air under pressure is normally admitted through the valve 80 and hose 88 to the piston-rod end of the cylinder, while the exhaust is connected through hose 90 to the other end of the cylinder, thus holding said piston away from the rod end 46, thereby holding raised the movable electrode 24 from the fixed electrode and holding open said switch 56, 58. The valve is so constructed that said core 96 is movable leftward to an active position in which air under pressure is admitted through the valve 80 and hose 90 to the switch contact end 48 of the cylinder to force said end and the piston apart to move the movable electrode 24 to the work pieces and to relatively move said contact blocks 56, 58 together to cause current flow in the primary and welding potential and current to be supplied to the electrodes.

A core 100 of magnetic material mounted on the valve core is received in a solenoid 102 adapted to draw the magnetic core to operate the valve core 96 to active position.

A normally open foot switch 104 connected by conductors 106, 108, 110 to a suitable source of current in circuit with said solenoid is adapted to be closed or opened to energize or deenergize said solenoid whereby the compressed air source is adapted to be selectively connected by the valve to said inlet or translation ports. Adjustable throttle valves 112, 114 in said hose 88 and 90 and a throttle valve 115 in the line 86 serve for adjusting the speed on the piston.

A branch pipe 116 connects the compressed air supply line 86 to the closed ends of pneumatic spring buffer cylinders 118 (Figs. 1 and 2) mounted on said plate on opposite sides of the fixed contact, each cylinder having therein a piston 120 the pistons together having a contact area less than the area of the piston 50. Each piston has a piston rod 122 engaging and pressing the adjacent head 48 of the power cylinder for opening the switch 56, 58 and to retard closing the switch until after the electrodes 16, 24 press on the work pieces and the pressure on the piston 50 overcomes the resistance of the buffer cylinder piston.

A shut-off valve 124 in said branch pipe serves for cutting off the air to the buffer cylinders when desired. If the air pressure in the supply line varies, pressure will be varied in both the power cylinder and the buffer cylinder, thus maintaining the same ratio of pressures in the cylinders.

In the modified form of cylinder return and retarding means shown in Fig. 3 compression springs 128 compressed between the fixed plate 62 and the adjacent cylinder head 48 serve to yieldably move the cylinder until the shoes engage against the stops 70 thus to open the switch 56, 58. Oil filled dash pots 130 mounted on the fixed plate 62 on opposite sides of the switch 56, 58 have their piston rods 132 pressed against the power cylinder, and retard movement of the cylinder toward the switch contact block 58 on the fixed plate, to retard closing the switch 56, 58 to prevent welding current from being applied to the electrodes until after the movable electrode 24 presses on the work piece, and the pressure on the piston 50 overcomes the resistance of the dash pot and the springs. A by-pass 134 connecting the ends of the dash pot has therein a check valve 136 allowing oil to move from the piston rod end of the dash pot to allow quick opening of the switch. A second by-pass 138 connecting the ends of the dash pot has an adjustable throttle valve 140 therein to regulate the speed of the dash pot piston.

We claim as our invention:

1. Control mechanism for a welding assembly comprising a fixed electrode; a movable electrode; and a transformer having the ends of its secondary electrically connected to said electrodes respectively; said mechanism comprising a power cylinder having a piston therein and a head; means operatively connecting the piston and movable electrode for urging the movable electrode toward the fixed electrode when the piston is moved from said head; a switch in circuit with the transformer primary of the assembly having one fixed contact member and a movable contact carried by said head and movable to the fixed contact when the head moves from the piston; means for at will supplying air under pressure to the cylinder between the piston and head for forcing them apart and closing the switch and moving the movable electrode to a work piece between the electrodes; and means for yieldably opening the switch and retarding the closing of the switch until the electrodes press on the work piece.

2. Control mechanism for a welding assembly comprising a pair of electrodes; and electric circuit controlled means for supplying welding current to said electrodes; said mechanism comprising a power cylinder having a head and a piston therein; means operatively connecting the piston to one electrode for urging such electrode toward the other electrode when the piston is moved from said head; a switch in said circuit having one fixed contact member and a movable contact carried by said cylinder and movable to the fixed contact when the cylinder moves from the piston and means for at will supplying air under pressure to the cylinder between the piston and head for forcing them apart and closing the switch and moving the electrode connected to the piston to a work piece between the electrodes.

3. A switch control mechanism for a welding assembly comprising a fixed support; a fixed electrode thereon; a lever pivoted on said support and carrying a movable electrode movable toward the fixed electrode; a transformer having the ends of its secondary electrically connected to said electrodes respectively; said mechanism comprising guides mounted on said support; a power cylinder having heads at both ends and disposed between and axially guided on the guides; a piston in said cylinder having a piston rod passing through one head and pivoted to the lever; a switch contact block mounted on and insulated from the other head; a switch contact block insulated and mounted on said fixed support engageable by the other switch block; said blocks constituting a switch in circuit with the primary of the transformer; valve means connected to a compressed air supply line to a source of compressed air for at will supplying air to either end of the power cylinder and exhausting the other end, and throttle valves between the valve means and the respective ends of the cylinder.

4. A mechanism as in claim 3 comprising yieldable means interposed between the fixed support and the cylinder for yieldably moving them apart and for retarding movement of the cylinder toward the switch contact on the fixed support, to retard closing the switch to prevent welding current from being applied to the electrode until after the movable electrode presses on the work piece.

5. A mechanism as in claim 3, pneumatic buffer cylinders interposed between the fixed support and the power cylinder each having therein a piston having a piston rod engaging the power cylinder for retarding movement of the cylinder toward the switch contact on the fixed support to yieldably separate the contacts and to retard closing the switch to prevent current from being applied to the electrodes until after the movable electrode presses on the work piece.

6. A switch control mechanism for an electric welding assembly comprising a fixed support; a fixed holder mounted on and insulated from said support and carrying a fixed electrode; an upright lever pivoted at its lower end on said support and carrying an electrode holder thereon and carrying a movable electrode movable toward and from the work pieces on the fixed electrode; a transformer having the ends of its secondary connected to said holders respectively; said control mechanism comprising a pair of parallel guides mounted on said support, each having a lower inturned flange; a power cylinder having heads at both ends and disposed between and axially parallel to the guides in the plane of movement of said lever on the side opposite from the electrodes and having fast thereon shoes of bearing material supported and guided on the flanges of the guides; a piston in said cylinder having a piston rod passing through the head adjacent to said lever and pivoted to the upper end of the lever; a switch in circuit with the transformer primary of the assembly having one fixed contact member and a movable contact carried by the head remote from the piston rod; and means for at will supplying air under pressure to the cylinder between the piston and the last named head for forcing them apart and closing the switch and moving the movable electrode to a work piece between the electrodes.

7. Control mechanism for a welding assembly comprising a fixed electrode; a movable electrode; and a transformer having the ends of its secondary electrically connected to said electrodes respectively; said mechanism comprising a power cylinder having a piston rod head and a closed head; a piston in the cylinder having a piston rod operatively connected to the electrode for urging the movable electrode to the fixed electrode when the piston is moved toward the piston rod head; a switch in circuit with the transformer primary of the assembly having one fixed contact member and a movable contact carried by said closed head; a four-way valve having a valve body having a supply port connected by supply line to a source of compressed air, two translation ports connected respectively to the opposite ends of the cylinder, exhaust ports and a movable core in the body biased to a normal inactive position in which air under pressure is normally admitted through the valve to the piston-rod end of the cylinder and the exhaust is connected to the other end to force said piston away from the rod end, thereby holding the movable electrode from the fixed electrode and holding open said switch, said core having an active position in which air under pressure is admitted through the valve to switch contact end of the cylinder to force said end and the piston apart to move the movable contact to the work pieces and said contacts together to cause welding potential and current to be supplied to the electrodes; a magnetic core on the valve core; a solenoid adapted to draw the magnetic core to operate the valve core to active position; and means for at will energizing said solenoid.

8. Control mechanism for a welding assembly comprising a fixed electrode; a movable electrode; and a transformer having the ends of its secondary electrically connected to said electrodes respectively; said mechanism comprising a pair of parallel fixed guides; a power cylinder having a head guided on said guides; a piston in the cylinder; means operatively connecting the piston and movable electrode for urging the movable electrode to the fixed electrode when the piston is moved from said head; a switch contact block mounted on and insulated from said head of the cylinder; a fixed support; a plate on said fixed support having insulated thereon a switch contact block engageable by the other switch block and limiting the movement of the cylinder in one direction; stops fast on the guides and engageable by the shoes to limit movement of the cylinder in the other direction; said contact blocks constituting a switch interposed and connected in circuit with the primary of the transformer; and means for at will supplying air under pressure between said piston and head.

9. Control mechanism for a welding assembly comprising a pair of electrodes; electric circuit controlled means for supplying current to said electrodes; said mechanism comprising a power cylinder having a piston therein and a head; means operated by the piston for urging one electrode to the other electrode; a fixed support; a switch in said circuit having one fixed contact mounted on the fixed support, and a movable contact carried by said head; an air pressure supply pipe; means for at will supplying air under pressure from said pipe to the cylinder between the piston and head for closing the switch and moving the one electrode to the other electrode; and buffer means for urging the cylinder and movable contact from the fixed contact and retarding the closing of the switch until the electrodes press on the work piece.

10. In control mechanism as in claim 9 said buffer means comprising automatic spring buffer cylinders mounted on said fixed support on opposite sides of the fixed contact, each having therein a piston having a piston rod engaging the adjacent head of the power cylinder for opening the switch and to retard closing the switch until after the electrodes press on the work pieces; and a branch pipe for connecting the supply pipe to the closed ends of the buffer cylinders, whereby if the air pressure in the supply pipe varies, pressure will be varied in both the power cylinder and the buffer cylinders.

11. In control mechanism as in claim 9 said buffer means comprising compression springs compressed between the fixed support and the cylinder head to yieldably move the power cylinder to open the switch; dash pots on opposite sides of the switch mounted on the fixed support, each having its piston rod secured to the power cylinder and retarding movement of the cylinder toward the fixed contact, to retard closing the switch to prevent welding current from being applied to the electrode until after the movable electrode presses on the work piece; a by-pass connecting the ends of each dash pot; a check valve in said by-pass admitting oil to the piston rod end of the dash pot to allow quick opening of the switch; and a second by-pass connecting the ends of the dash pot having an adjustable throttle valve therein to regulate the speed of the dash pot piston.

12. A switch control mechanism for a welding assembly comprising a fixed support; a fixed electrode thereon; a movable electrode; electric circuit controlled current supply means operable to supply or withhold current to said electrodes; a power cylinder having heads at both ends; a piston in said cylinder having a piston rod passing through and operatively connected to the movable electrode; a switch in said circuit having a contact on said cylinder, and a fixed contact on said support; a compressed air supply line to a source of compressed air; a throttle valve in said line; a pair of hose connected to the respective ends of the power cylinder; valve means connected to said line and operable to connect the line with either hose; adjustable throttle valve between said valve means and said hose for adjusting the speed of the piston.

13. A control mechanism as in claim 12 comprising pneumatic buffer cylinders interposed between the fixed support and the power cylinder each having therein a piston having a piston rod engaging the power cylinder for retarding movement of the power cylinder toward the switch contact on the fixed support to yieldably separate the contacts and to retard closing the switch to prevent welding current from being applied to the electrodes until after the movable electrode presses on the work piece; a branch pipe connecting the closed end of the buffer cylinder to the compressed air line; and a throttle valve in the branch pipe.

References Cited in the file of this patent

UNITED STATES PATENTS

| | | |
|---|---|---|
| 1,750,757 | Johnson | Mar. 18, 1930 |
| 1,779,365 | Henke | Oct. 21, 1930 |
| 2,244,508 | Henke | June 3, 1941 |